United States Patent
Häggander et al.

(10) Patent No.: US 6,789,316 B2
(45) Date of Patent: Sep. 14, 2004

(54) METHOD FOR MANUFACTURING OUTLET NOZZLES FOR ROCKET ENGINES

(75) Inventors: Jan Häggander, Trollhattan (SE); Jan Lundgren, Grundsund (SE)

(73) Assignee: Volvo Aero Corporation, Trollhattan (SE)

(*) Notice: Subject to any disclaimer, the term of this patent is extended or adjusted under 35 U.S.C. 154(b) by 0 days.

(21) Appl. No.: 10/604,321

(22) Filed: Jul. 10, 2003

(65) Prior Publication Data

US 2004/0123460 A1 Jul. 1, 2004

Related U.S. Application Data

(63) Continuation of application No. PCT/SE02/00024, filed on Jan. 9, 2002.
(60) Provisional application No. 60/261,049, filed on Jan. 11, 2001.

(30) Foreign Application Priority Data

Jan. 11, 2001 (SE) ................................................ 0100077

(51) Int. Cl.[7] ................................................ B23P 15/00
(52) U.S. Cl. ........................ 29/890.01; 29/428; 29/557
(58) Field of Search .......................... 29/890.01, 557, 29/428, 469, 463; 60/257, 267

(56) References Cited

U.S. PATENT DOCUMENTS

| | | | | |
|---|---|---|---|---|
| 3,267,559 A | * | 8/1966 | Laux | 29/890.01 |
| 3,418,707 A | * | 12/1968 | Emerson | 29/890.01 |
| 3,481,543 A | * | 12/1969 | Lovingham | 239/127.3 |
| 3,521,344 A | * | 7/1970 | Biehl et al. | 29/890.01 |
| 3,521,345 A | * | 7/1970 | Biehl et al. | 29/890.01 |
| 3,537,646 A | * | 11/1970 | Emerson | 239/265.15 |
| 3,630,449 A | * | 12/1971 | Butler | 239/127.1 |
| 3,729,793 A | * | 5/1973 | Schmidt et al. | 29/890.01 |
| 3,890,781 A | * | 6/1975 | Schmidt et al. | 60/267 |
| 6,591,499 B1 | * | 7/2003 | Lundgren | 29/890.01 |
| 2003/0230071 A1 | * | 12/2003 | Haggander | 60/257 |

FOREIGN PATENT DOCUMENTS

| GB | 843923 A | 8/1960 |
|---|---|---|
| WO | WO 0020749 A1 | 4/2000 |

* cited by examiner

Primary Examiner—I. Cuda Rosenbaum
(74) Attorney, Agent, or Firm—Novak Druce LLP

(57) ABSTRACT

Method and arrangement for manufacturing an outlet nozzle (10) for use in a liquid fuel rocket engine. The nozzle forms a body of revolution having an axis of revolution and a cross section that varies in diameter along said axis. The nozzle has a wall structure comprising a plurality of mutually adjacent cooling channels extending substantially in parallel from the inlet end (12) of the nozzle to its outlet end (13). The method includes providing a plurality of preprocessed profile members, each having a web and flanges in opposite directions from said web. Each profile member is machined to present a longitudinally gradually tapering width. The member is curved to conform with the wall section of the nozzle, and members are joined by welding the flanges to form a bell-shaped nozzle structure with cooling channels (11) formed by adjacent webs and adjacent pairs of flanges.

14 Claims, 4 Drawing Sheets

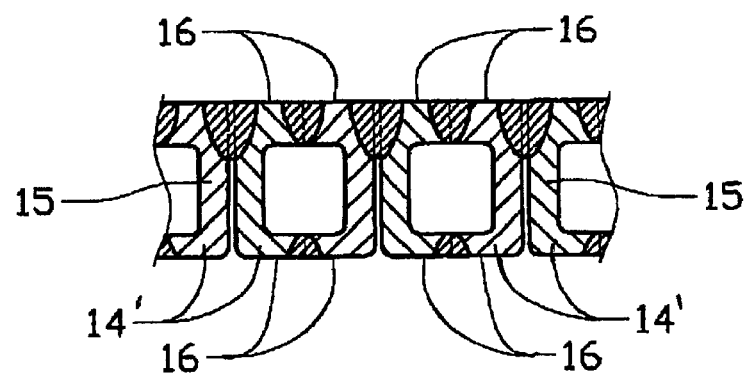
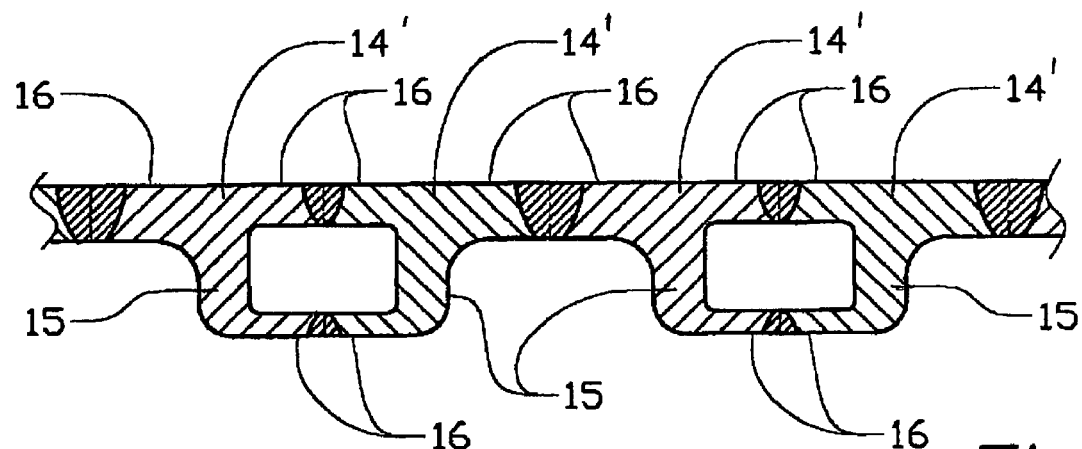

METHOD FOR MANUFACTURING OUTLET NOZZLES FOR ROCKET ENGINES

CROSS REFERENCE TO RELATED APPLICATIONS

This application is a continuation patent application of International Application No. PCT/SE02/00024 filed Jan. 9, 2002 now abandoned which was published in English pursuant to Article 21(2) of the Patent Cooperation Treaty, and which claims priority to Swedish Application No. 010077-7 filed Jan. 11, 2001 and to U.S. Provisional Application No. 60/261,049 filed Jan. 11, 2001. Said applications are expressly incorporated herein by reference in their entireties.

BACKGROUND OF INVENTION

1. Technical Field

The present invention relates to a method for manufacturing outlet nozzles for use in rocket engines.

2. Background of the Invention

During operation, a rocket nozzle is subjected to very high stresses, for example in the form of a very high temperature on its inside (on the order of magnitude of 980° F.) and a very low temperature on its outside (on the order of magnitude of −370° F.). As a result of this high thermal load, stringent requirements are placed upon the choice of material, design and manufacture of the outlet nozzle. At a minimum, the need for effective cooling of the outlet nozzle must be considered.

Cooling is normally provided by attaching individual lengths of tubing on the inside surface of the nozzle. The geometry of each tube is such that it must conform to the conical or parabolic shape of the nozzle. Additionally, the entire inside surface of the nozzle must be covered to prevent "hot spots" which could result in premature failure of the nozzle. Each nozzle typically has a diameter ratio from the aft or large outlet end of the nozzle relative to the forward or small inlet end of the nozzle ranging from 2:1 to 3:1.

According to a previously known method of manufacturing a cooled outlet nozzle, rectangular tubes of constant cross section made from nickel-based steel or stainless steel are utilized and arranged parallel with another, and are welded together. The tubes are helically wound such that they form an angle of helix in relation to the longitudinal axis of the nozzle, which angle increases progressively from the inlet end of the nozzle to its outlet end, thereby forming a bell shaped nozzle wall. Rocket engine exhaust flowing along the inside surface of such a nozzle with these helically arranged tubes results in an angled reaction force that induces a roll momentum on the rocket and which must be compensated for by some additional means. These additional means often lead to increased weight and increased flow resistance. Moreover, the spiral winding means that the cooling ducts are long and hence give rise to an increased pressure drop in the flow of cooling medium.

A further method for manufacturing a rocket nozzle is described in patent document WO 00/20749. According to this method, an outer wall is positioned around an inner wall and a plurality of distancing elements are positioned between the inner wall and the outer wall. Finally, the distancing elements are joined to the walls. The distancing elements may also be integrated with the inner wall, for instance, by means of milling the inner wall. In this manner, the cooling channels may be parallel to the longitudinal axis of the nozzle. With this method, it is difficult to vary the cross sectional area of the cooling channels in the longitudinal direction to obtain the desired diameter ratio. To overcome this, the nozzle must be built in several sections in the axial direction.

SUMMARY OF INVENTION

An objective of the present invention is to provide an improved method for manufacturing a cooled outlet nozzle for a rocket engine.

This is achieved by providing a plurality of preprocessed profile members, each having a web and flanges protruding from said web. Each profile member is milled to present a longitudinally gradually tapering width. The members are curved to conform with the wall section of the nozzle and are joined the members by welding the flanges to form a bell-shaped nozzle structure with cooling channels formed by adjacent webs and adjacent pairs of flanges.

Utilizing such a method enables a rocket engine nozzle to be manufactured that presents high pressure capacity, a low coolant pressure drop, and a long cyclic life, as well as advantageous area ratio.

BRIEF DESCRIPTION OF DRAWINGS

The invention will be further described in the following, in a non-limiting way with reference to the accompanying drawings in which:

FIG. 4 is a partial sectional view from a position corresponding to that shown in FIG. 2, but illustrating an alternative embodiment of two cooling channels at the inlet end of a nozzle;

FIG. 5 is a corresponding view to that of FIG. 4, but showing the cooling channels at the outlet end of the nozzle.

DETAILED DESCRIPTION

Figure 1:
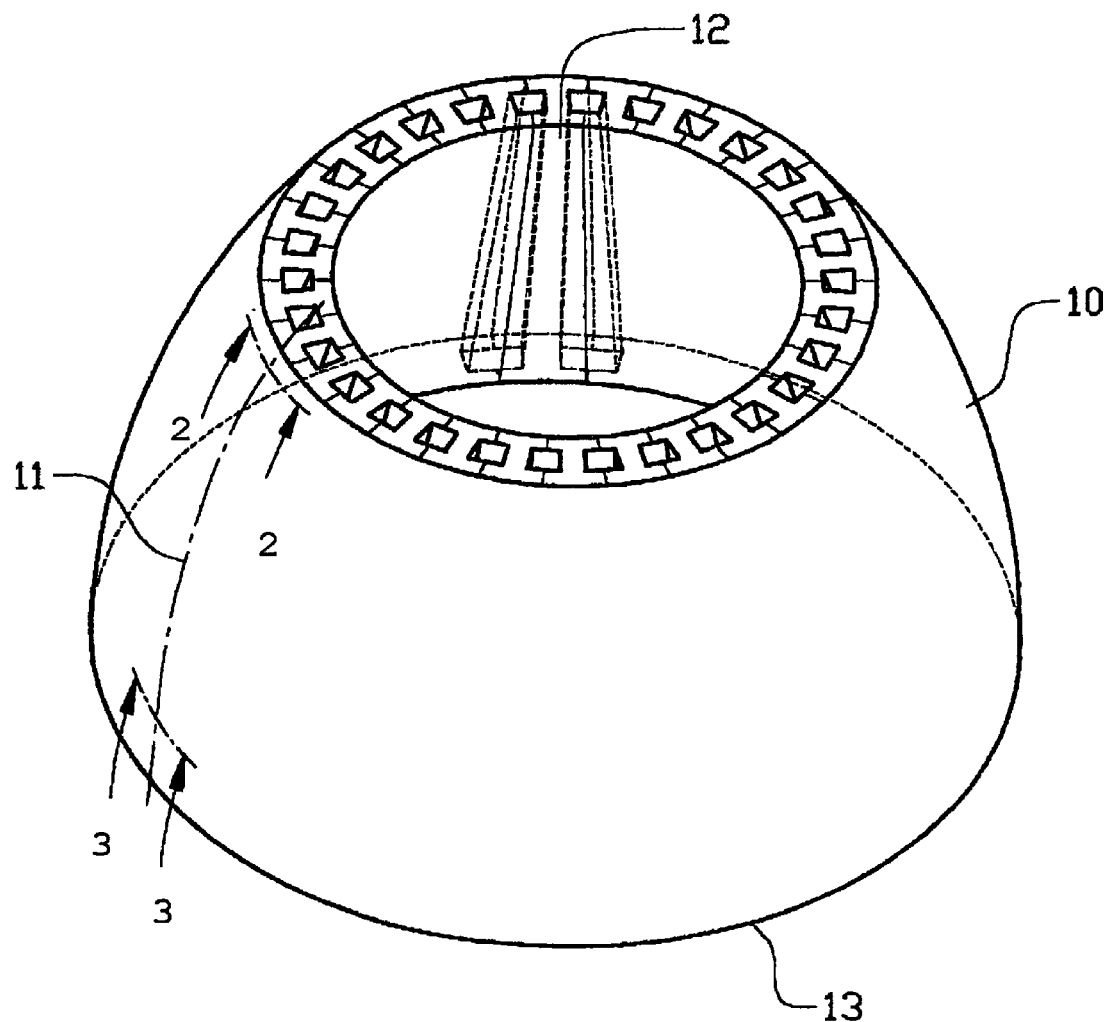
FIG. 1 is a perspective view showing a nozzle configured according to the teachings of the present invention.

FIG. 1 shows a diagrammatic and somewhat simplified perspective view of an outlet nozzle 10 that is produced according to the teachings of the present invention(s). The nozzle is intended for use in rocket engines of the type using liquid fuel, for example liquid hydrogen. The working of such a rocket engine is conventional and therefore not described in detail. The nozzle 10 is cooled with the aid of a cooling medium that is preferably also used as fuel in the particular rocket engine. The invention is, however, not limited to outlet nozzles of this type, but can also be used in those cases in which the cooling medium is dumped after it has been used for cooling.

The outlet nozzle is manufactured with an outer shape that is substantially bell-shaped. Thus, the nozzle 10 forms a body of revolution having an axis of revolution and a cross section that varies in diameter along said axis.

The nozzle wall is a structure comprising (including, but not limited to) a plurality of mutually adjacent, tubular cooling channels 11 extending substantially in parallel to the longitudinal axis of the nozzle from an inlet end 12 to an outlet end 13. The structure is built-up by profile members 14 having a varying cross section. The profile members are oriented axially along the nozzle wall and are curved in the longitudinal direction to conform to the nozzle contour.

Figure 2:
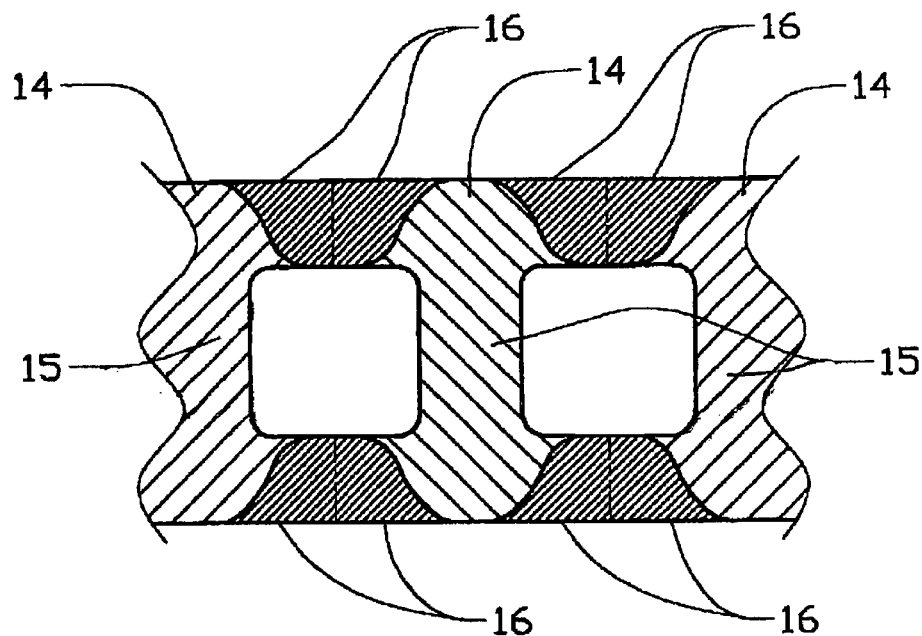
FIG. 2 is a partial sectional view taken along the line 2—2 in FIG. 1, showing two cooling channels at the inlet end of the nozzle.
Figure 3:
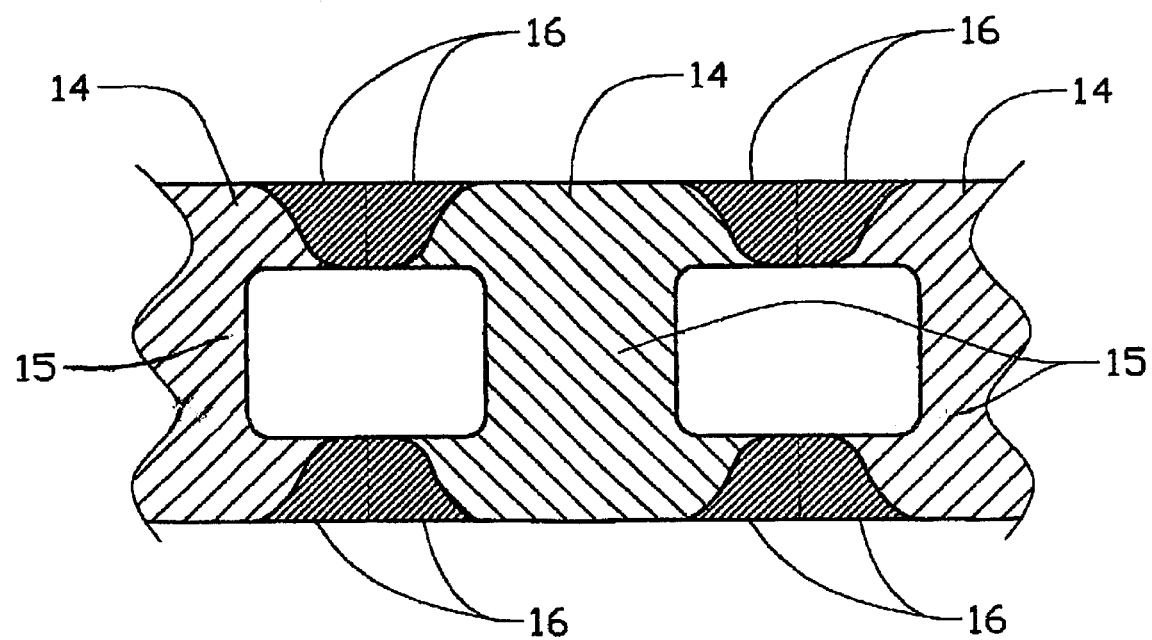
FIG. 3 is a similar view as FIG. 2, but showing the cooling channels taken along the line 3—3 at the outlet end of the nozzle.

The cooling channels in the embodiment shown in FIGS. 2 and 3 are constructed by joining substantially H-shaped, preprocessed profile members 14. Each profile blank has a web 15 and two pairs of flanges 16 in opposite transverse directions from said web 15. These profile blanks are milled to have a longitudinally tapering cross section and width in the direction of the inlet end 12. For this purpose, the web 15 can be machined to have a corresponding longitudinally tapering thickness. Further, the flanges 16 can be machined to establish the difference in diameter between the inlet 12 and outlet 13 ends. This design also makes it possible to use materials with high conductivity such as copper and aluminum.

After bending the profiles to a suitable (desired) curvature, each is joined together by butt-welds either by fusion welding or friction welding to form a defining nozzle wall. The butt-welds connect the flanges 16 of adjacent profile members 14 at both interior and exterior sides of the nozzle wall. In these areas of the profiles, the bending stresses are considerably reduced compared to the transitions between the flanges and the adjacent web.

It is also possible to build the structure described above from the common materials for rocket engine nozzle tubes such as stainless steel and nickel based alloys. However, by using material with high thermal conductivity, large area ratios may be obtained. The low density of aluminum allows for a thick web between the channels, without resulting in excessive weight. The high conductivity in the material reduces the material temperature, and at the same time increases the rate at which heat is transferred from the flame to the cooling medium. The increased heat transfer is beneficial to an expander cycle of the rocket engine. For an aluminum nozzle, the increase in heat transfer compared to a corresponding stainless steel nozzle is on the order of ten percent.

FIGS. 4 and 5 depict a second embodiment of the invention. In FIG. 4, each profile blank end has substantially a C-shape in cross section. A flange extends from each end (upper and lower ends as shown in the figure) of the web 15 and the two flanges 16 are provided on the same side of the web 15. Further, the flanges 16 project substantially perpendicular from the web 15.

In FIG. 5, each profile blank end is provided with two flanges 16 on one side of the web 15 and a single flange 16 on the opposite side of the web, forming an h-shape in cross section. The "h" is in this case lying, or tilted 90°. In other words, two flanges 16 extend in opposite directions from one end (upper end in FIG. 5) of the web 15 and a further flange 16 extends from the other end (lower end in FIG. 5) of the web 15. Each of the flanges 16 project substantially perpendicular from the associated web 15.

As in the previously described embodiment, the flanges 16 of this alternative embodiment can be machined to present the desired longitudinally tapering section. As the profile blanks are not symmetrical, it is necessary in the machining process to make both left and right hand versions of the profile members. The weld is accessible from the outside permitting assembly welding from the outside.

These profile blanks are milled to have a longitudinally tapering cross section and width from outlet to inlet. For this purpose, the web 15 can be machined to have a corresponding longitudinally tapering thickness in the direction of the inlet end 12. Also, the flanges 16 can be machined to conform to the difference in diameter between the inlet 12 and outlet 13.

Figure 6:
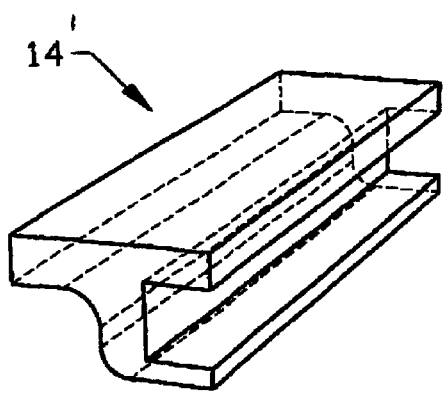
FIGS. 6 and 7 provide a perspective view of a profile blank before and after milling, respectively.

The method for manufacturing a profile blank will be described below with reference to FIGS. 6 and 7. FIG. 6 shows a profile blank 14' which has been formed by an extrusion process. The profile blank 14' has an profile blank 14' maintains its h-shape in cross section at one end 17, but transitions to a c-shape in cross section at the other end 18. Material is milled away from the profile blank on lateral sides.

Figure 7:
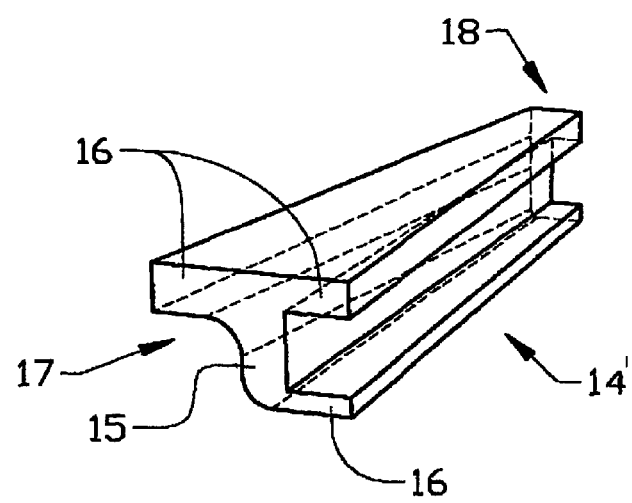

In FIG. 7, the milled profile blank 14' has a linearly tapering shape in its longitudinal direction. It should be appreciated, however, that other shapes are also possible depending on the desired shape of the resultant nozzle 10. For example, the profile blank may have a curved shape in its longitudinal direction.

Referring to FIG. 5, the profile members 14' are joined by fusion or solid state welding, such as friction welding so that the parallel and abutting pairs of flanges (bottom portions of the "h's") in two adjacent members form a cooling channel. The single flange (top portion of the "h's") in the pair of members of the next following joint is joined as in FIG. 5. With this configuration, the welding of a pair of left and right profile members to form the cooling channel can be made before the actual welding to form the nozzle. Thus, the cooling channel welds are accessible from both sides. Subsequently, the pairs of profile members are joined to form the nozzle, preferably by welding from the outside of the nozzle.

In the embodiment depicted in FIGS. 4 and 5, the wet surface, i.e., the bottom surface in contact with the rocket flame during operation, is increased to enhance the heat transfer to the cooling medium. Also, the inner wall is not continuous which minimizes the introduction of thermal stress in the tangential direction. The increased wet surface provided according to this embodiment cools the boundary layer more than conventional designs. The boundary layer leaving the rocket nozzle will be cooler. The cooler boundary layer serves as cooling film for an eventual non-cooled nozzle extension that may be used as a low cost solution-when the heat load is limited.

Further, the manufacturing method provides for obtaining large area differences in the two end portions of the profile blank, and especially large differences in extension of the profile blank end portions in a direction perpendicular to the longitudinal direction of the profile blank. Conventional nozzles are formed by a plurality of nozzle sections, which are mutually connected to each other in the axial direction of the nozzle. Each such section comprises a plurality of cooling channels. Due to the manufacturing method of this invention, the number of necessary nozzle sections may be reduced as a consequence of the longer profile blanks.

As an alternative to the above described manufacturing methods, the profile members 14" may be preprocessed by roll forming sheet metal plate. This sheet metal plate may for example comprise stainless steel and nickel base material.

The teachings of the present invention(s) allows for the building of large nozzles with large expansion ratios. It also enables the cooling channels to have wide cross sections as the area ratio is increasing. Wide channels limit the pressure capacity in the cooling channels. The large distance in between cooling channels increases the area ratio without increasing the cross section of the cooling channels.

Another advantage of the invention is the arrangement of the cooling channels that offers a large cooling surface. The cooling channels do not have to cover the entire circumference. This means that the maximum diameter becomes smaller. The pressure capacity benefits from the smaller diameter.

The rotational symmetric surface of the proposed nozzle provides stiffness in itself, and allows for easy attachment of stiffeners, when needed. The cross section of the cooling channels may be close to circular. This means that the temperature differences and associated stresses are lower than compared to nozzle walls that have a continuous inner wall.

It should be appreciated that the invention is not limited to the above-described embodiments, but modifications are possible within the scope of the presented claims.

What is claimed is:

1. Method for manufacturing an outlet nozzle (10) for use in a liquid fuel rocket engine, said method comprising:

providing nozzle forming a body of revolution having an axis of revolution and a cross section that varies in diameter along said axis, said nozzle having a wall structure comprising a plurality of mutually adjacent cooling channels (11) that extend, substantially in parallel with one another, from an inlet end (12) to an outlet end (13) of the nozzle;

providing a plurality of preprocessed profile members (14, 14'), each having a web (15) and flanges (16) protruding from said web;

milling each profile member (14) to present a longitudinally gradually tapering width;

configuring at least said profile members (14'), at least at a first end portion (17) thereof, with two flanges (16) on one side of the web (15) and one flange (16) on the opposite side of said web, said profile member (14') having an h-shape at said first end portion (17);

curving said member (14) to conform with the wall section of the nozzle; and joining the members by welding the flanges (16) to form a bell-shaped nozzle structure with cooling channels (11) formed by adjacent webs (15) and adjacent pairs of flanges (16).

2. The method as recited in claim 1, further comprising:

configuring said flanges (16) to protrude in opposite directions from said web (15).

3. The method as recited in claim 1, further comprising:

milling said profile member (14') in such a way that said single flange on the opposite side of the web is at least substantially eliminated at a second end portion (18) of the profile member, so that the profile member at said second end portion forms a C-shape in cross section.

4. The method as recited in claim 1, further comprising:

providing each profile member (14) with two flanges (16) on each side of the web (15).

5. The method as recited in claim 1, further comprising:

forming the profile members (14,14') by extrusion.

6. The method as recited in claim 5, further comprising:

extruding said profile members (14,14') from aluminum.

7. The method as recited in claim 6, further comprising:

extruding said profile members (14,14') from copper.

8. The method as recited in claim 7, further comprising:

extruding said profile members (14,14') with rounded transitions between the web (15) and the flanges (16).

9. The method as recited in claim 1, further comprising:

forming said profile members (14,14') from sheet metal plate.

10. The method as recited in claim 9, further comprising:

selecting said sheet metal plate to comprise stainless steel and nickel base material.

11. The method as recited in claim 1, further comprising:

milling said flanges (16) so that a channel cross sectional area is larger at the outlet nozzle end (13) than at the inlet nozzle end (12).

12. The method as recited in claim 1, further comprising:

milling the web (15) to present a longitudinally gradually tapering width.

13. The method as recited in claim 1, further comprising:

performing the welding processes by means of fusion welding.

14. The method as recited in claim 1, further comprising:

welding the profile members (14) to present a rotational symmetric outer nozzle surface.

* * * * *